(No Model.)
H. CLARK.
SHOVELING BOARD FOR WAGONS.
No. 535,442. Patented Mar. 12, 1895.
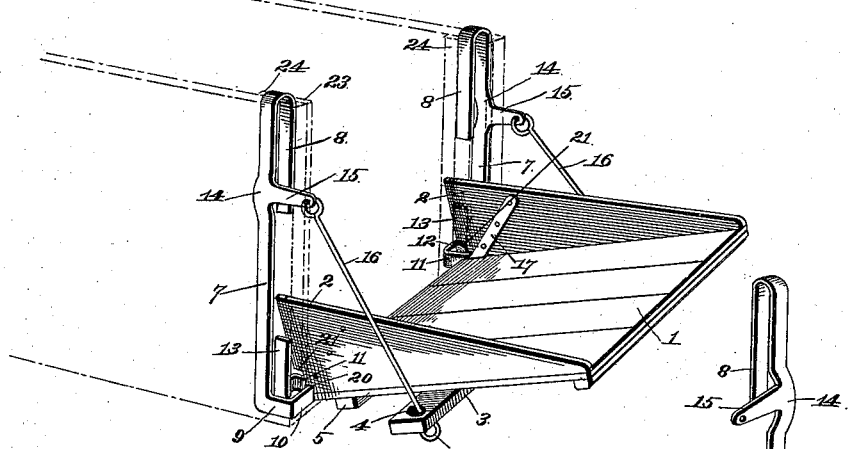
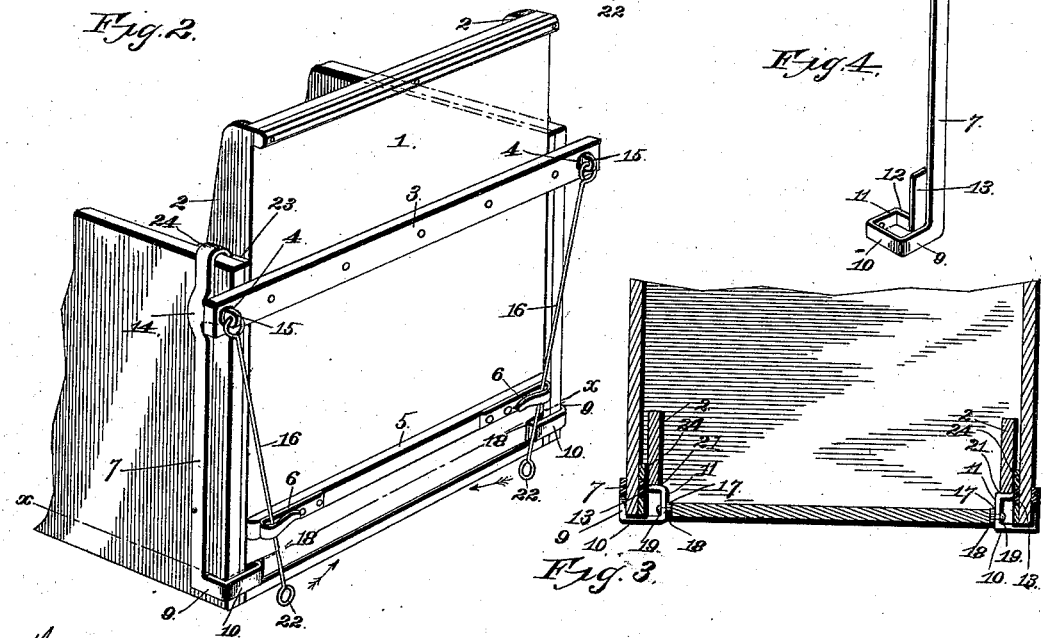
Witnesses:
Inventor:
Has Clark.
By Higdon & Higdon
attys.

UNITED STATES PATENT OFFICE.

HAS CLARK, OF KANSAS CITY, KANSAS.

SHOVELING-BOARD FOR WAGONS.

SPECIFICATION forming part of Letters Patent No. 535,442, dated March 12, 1895.

Application filed May 14, 1894. Serial No. 511,160. (No model.)

*To all whom it may concern:*

Be it known that I, HAS CLARK, of Kansas City, Wyandotte county, Kansas, have invented certain new and useful Improvements in Shoveling-Boards for Wagons, of which the following is a full, clear, and exact description, reference being had to the accompanying drawings, forming a part hereof.

My invention relates to end-boards for wagon boxes, and more particularly to that class termed shoveling-boards, which comprise brackets detachably secured to the discharge end of the wagon-box, and a hinged board carried by said brackets, and the object of the invention is to generally improve the construction of such devices so that they will fit any wagon-box corresponding in size, will additionally strengthen the discharge end of the wagon-boxes to which they are attached, and will not jar out of position when traveling over rough roads.

With this object in view, the invention consists in certain peculiar and novel features of construction and combinations of parts, as hereinafter described and claimed.

In order that the invention may be fully understood, reference is to be had to the accompanying drawings, in which—

Figure 1. is a perspective view of a shoveling-board in its open position, and showing in relative position thereto, in dotted lines, the discharge end of a wagon-box. Fig. 2. is a perspective view of the discharge end of a wagon-box, and showing the same closed by my improved shoveling-board. Fig. 3. is a horizontal sectional view taken on the line x—x of Fig. 2, and Fig. 4. is a detail perspective view of one of the brackets.

In the said drawings, 1 designates the transverse portion of the shoveling-board, and 2 designates the side-boards which project at right-angles and marginally from the inner side of the portion 1. Secured transversely to the outer side of the portion 1, and projecting a suitable distance beyond the side-margins of the same, is a bar 3, and this bar, near its outer ends, is provided with the apertures 4, and secured also to the outer side of the portion 1, and a slight distance from its lower or inner margin, is a strip 5, which carries near each end the inwardly disposed spring-hook 6.

A pair of brackets comprise the vertically and oppositely disposed portions 7, which are of equal length, and are bent over at their upper ends so as to form the pendent arms 8, which are a distance from their respective portions 7 slightly exceeding the width of the side-boards of the wagon-box, and are arranged parallel with and inward of said arms 7. The portions 7, at their lower ends, are bent to form the rearwardly extending and parallel arms 9, the transversely extending and aligned arms 10, the forwardly extending and parallel arms 11, the outwardly extending and aligned arms 12, and the upwardly extending and parallel arms 13; these arms 13 being parallel with the portions 7, and vertically beneath and aligned with the depending arms 8. The portions 7, at a suitable distance from their upper ends, are bent outwardly to form the offset 14, so as to avoid the nut which is employed at the outer side in nearly all wagon-boxes to secure the cleats in position, and projecting from the portions forming said offsets are the parallel arms 15, and pivotally engaging apertures in the rear ends of said arms, are the eyes at the upper end of a pair of supporting rods 16.

Secured to the inner side of each side-portion 2 of the shoveling-board, is a metallic strip 17, and these metallic strips at their lower ends, project through a notch or recess formed in the transverse portion 1, at the junction of its hinge-margin with the said sides, and the arms 11 are pivotally connected at 19 to the lower ends of said strips. The lower or inner margins of the sides 2 are stepped at 20 and 21, to receive, respectively, the arms 10 when the device is in its open position, and the arms 12 when the device is in its closed position. The rods 16 project through the apertures 4 of the board 3, and are bent to form the enlargements 22 at their lower ends, and upon said enlargements the cross-bar rests when the shoveling-board is in its open position, as shown in Fig. 1, and when said shoveling-board is in its closed position the arms 15 project rearwardly through the openings 4, and the rods 16 support the shoveling-board in its vertical position by engaging the spring-hooks 6, as shown clearly in Fig. 2.

To secure the shoveling-board in position, said shoveling-board is elevated above the discharge end of the wagon-box, and with the arms 13 vertically above the grooves formed by the cleats 23 and 24, secured vertically to the inner side of the wagon-box. It is then allowed to vertically descend until the lower margin of the portion 1 rests upon the bottom of the wagon, the portions 7 of the brackets bear against or embrace the outer sides of the wagon-box, and the depending arms 8 engage the upper portions of said grooves, and when in this position it is impossible to dislodge the shoveling-board from position, because it must be elevated vertically a distance equaling the depth of the wagon-box before it can be removed.

When it is desired to shovel grain from the wagon, it is necessary only to move the rods 16 pivotally inward to disengage the same from the spring hooks 6, which being narrower at their mouth than the diameter of said rods, prevent their accidental dislodgment, and then move the shoveling-board pivotally to the position shown in Fig. 1, when the grain may be easily and conveniently shoveled from the wagon. It will be apparent, by forming these hooks with the portions 7, which embrace the outer sides of the wagon-box, and then tying said brackets together by means of the shoveling-board proper, that the sides of the wagon-box, being braced from outward movement at their discharge end, are strengthened to resist the pressure offered by a heavy load. It will be apparent, also, that small grain may be hauled as well as larger grain, and that the shoveling-board may be easily and expeditiously placed in or removed from position, and that without injuring the wagon-box by forming bolt-holes, &c., through the same.

I am aware that hinged shoveling-boards provided with brackets to embrace the sides of the wagon-box are not new. Therefore I claim only the specific construction of these brackets in combination with other elements old in the art.

Having thus described my invention, what I claim as new, and desire to secure by Letters Patent, is—

1. The combination with a wagon-box, provided with vertical grooves at its inner side, of a pair of brackets having vertically pendent portions 8, engaging the upper ends of the said grooves, vertical portions 13 projecting upwardly and engaging the lower ends of said grooves, and vertical portions 7, formed integral with the portions 8 and 13, fitting against the outer sides of the wagon-box, and an end-board pivotally connected to said brackets and closing the rear end of the wagon-box, substantially as and for the purpose set forth.

2. The combination with a pair of brackets detachably embracing the outer sides of the wagon-box, and having at their lower ends the arms 9, 10, 11, and 12, of a shoveling-board notched to receive at times the arms 10 and 12, and pivotally mounted upon the arms 11, substantially as set forth.

In testimony whereof I affix my signature in presence of two witnesses.

HAS CLARK.

Witnesses:
G. Y. THORPE,
M. R. REMLEY.